United States Patent [19]
Leach

[11] Patent Number: 5,612,074
[45] Date of Patent: Mar. 18, 1997

[54] NUTRIENT FORTIFIED FOOD BAR

[76] Inventor: Robin L. Leach, 5358 Calder Way A518, Indianapolis, Ind. 46226

[21] Appl. No.: 548,804

[22] Filed: Dec. 21, 1995

[51] Int. Cl.$^6$ .............................. A23L 1/0562; A23L 1/29
[52] U.S. Cl. ............................ 426/74; 426/102; 426/103; 426/601; 426/629; 426/632; 426/639; 426/656; 426/658; 426/662
[58] Field of Search ..................................... 426/601, 102, 426/103, 74, 632, 629, 639, 656, 658, 662

[56] References Cited

U.S. PATENT DOCUMENTS

| | | | |
|---|---|---|---|
| 3,787,591 | 1/1974 | Hagiwara | 426/640 |
| 4,784,867 | 11/1988 | LaBaw | 426/632 |
| 4,871,557 | 10/1989 | Linscott | 426/640 |
| 5,389,395 | 2/1995 | Joseph et al. | 426/74 |
| 5,484,623 | 1/1996 | McLean | 426/601 |

*Primary Examiner*—Helen Pratt

[57] ABSTRACT

A nutrient fortified non-cooked food bar having dietary fiber, non-animal protein, simple carbohydrates, complex carbohydrates, sugars, antioxidant and lecithin that additionally provides polyunsaturated linoleic acid, superunsaturated alpha-linolenic acid, amino acids, magnesium, chlorophyll and pyridoxine, and includes sodium and potassium in a metabolically advantageous ratio, and has no cholesterol, artificial additives, preservatives, flavorings and colors and a minimum amount of saturated fat. A mixture of dry ingredients are combined with a mixture of liquid ingredients in a ratio of about 3:1 by weight. Dry ingredients include about 38% dietary fibers, about 18% non-animal proteins, oil seeds containing polyunsaturated linoleic acid, superunsaturated alpha-linolenic acid, and amino acids, and ingredients containing chlorophyll, pyridoxine, magnesium. The mixture of liquid ingredients include about 90% by weight of naturally occurring syrup sweeteners, vegetable oils, and liquid flavorings. The food bar contains about 35% by weight of complex carbohydrates, about 17% by weight of simple carbohydrates, with polyunsaturated linoleic acid present in a ratio of about 3:1 by weight to superunsaturated alpha-linolenic acid, and potassium present in a ratio of about 10:1 by weight to sodium.

22 Claims, No Drawings

NUTRIENT FORTIFIED FOOD BAR

BACKGROUND OF THE INVENTION

1. Field of the Invention

The present invention generally relates to the field of food composition, and more particularly relates to food bars of the type that are fortified with advantageous nutrients and that may be prepared without baking or cooking.

2. Description of the Prior Art

Non-cooked food bars have been known and available for sometime. Such food bars may contain a grain or grains, nuts, possibly dried fruit, sweeteners and other ingredients that may be mixed with a binder, such as a sugar syrup or shortening, and formed into "bars" of a desired size. Generally, food bars are prepared in bar form of a manageable size for a product of this nature, and bearing in mind both package size and time required for consumption, weigh in the range of 2–3 ounces.

To provide an acceptable amount of nutrition, food bars may contain relatively large amounts of protein in addition to significant amounts of complex and simple carbohydrates. However, because many proteins and protein sources have objectionable flavor, a serious problem may be presented in achieving both the high protein content and an appealing flavor in a food bar of the desired size. There are presently available non-cooked food bars with significant protein content such as described by U.S. Pat. No. 4,055,669.

Dietary fiber refers to the indigenous components of plant materials in the diet which are resistant to digestion by enzymes produced by humans and are provided by many food bars. Dietary fiber consists of all polysaccharides and lignin that are not digested by secretions of the human digestive tract. Although "fiber" generally refers to filamentous, stringy materials, "dietary fiber" is often gelatinous or mucilaginous. In recent years, the apparent physiological benefits of adequate levels of dietary fiber in the diet have been widely reported, including normalization of bowel function and reduction of occurrence of certain colonic diseases. There are presently available a number of non-cooked food bars that provide varying amounts of dietary fiber while possessing requisite qualities of acceptable taste and texture, including food bars described in U.S. Pat. Nos. 4,673,578, and 4,871,557.

Antioxidants have been reported to prevent the formation of free radicals and oxidant wastes. Food bars containing antioxidants are also presently available, such as described in U.S. Pat. No. 4,451,488.

Lecithin has been reported to aid in digestion of fats and supplies choline, necessary for the production of the neurotransmitter acetylcholine, and has been used in presently available food bars such as described in U.S. Pat. No. 4,871,557.

Despite the availability of such non-cooked food bars having dietary fiber, protein, antioxidants and lecithin, there exists a need in the art for a non-cooked food bar formed of naturally occurring ingredients that is capable of supplying additional nutrients that are indicated by current scientific research to be advantageous in human nutrition or to help facilitate more complete metabolism of other ingredients thereof, yet has desirable characteristics of taste, texture, and shelf life.

SUMMARY OF THE INVENTION

In order to aid in the understanding of the present invention, it can be stated in essentially summary form that it is directed to a non-cooked food bar having dietary fiber, non-animal protein, simple and complex carbohydrates, sugar, antioxidant and lecithin that is fortified with additional ingredients including essential fatty acids, particularly polyunsaturated linoleic acid and superunsaturated alpha-linolenic acid, amino acids, magnesium, chlorophyll and pyridoxine, and includes sodium and potassium in a metabolically advantageous ratio to provide advantageous nutrition and more complete metabolic use of ingredients, yet has attractive taste, texture, and shelf life characteristics, and has no cholesterol, artificial additives, preservatives, flavorings and colors and a minimum amount of saturated fat.

It is an object of the present invention to provide a food bar that provides a wide variety of ingredients of having favorable nutritional characteristics without providing cholesterol, artificial additives, preservatives, flavorings or colors, and has a minimum amount of saturated fat.

It is another object of the present invention to provide a food bar that may be produced by simple mixing and forming without the need for baking, cooking, or other techniques, yet has desirable taste, texture, and shelf life.

It is another object of the present invention to provide a food bar that provides dietary fiber, non-animal protein, simple and complex carbohydrate, sugar, and lecithin.

It is another object of the present invention to provide a food bar that provides and preserves polyunsaturated linoleic acid and superunsaturated alpha-linolenic acid in a ratio of approximately 3:1 by weight.

It is another object of the present invention to provide a food bar having a water content that is less than about 10% by weight.

It is another object of the present invention to provide a food bar having a ratio of water to sugar of approximately 1:3 by weight.

It is another object of the present invention to provide a food bar that provides amino acids, including methionine and tryptophan.

It is another object of the present invention to provide a food bar that provides magnesium, chlorophyll and pyridoxine.

It is another object of the present invention to provide a food bar that provides sodium and potassium in an advantageous ratio.

It is yet another object of the present invention to provide a food bar that is inexpensive and easy to produce from readily available ingredients.

Further objects and advantages of the present invention will be apparent from a study of the following portion of the specification and the claims.

DESCRIPTION OF THE PREFERRED EMBODIMENTS

The following portion of the specification, sets forth the preferred embodiments of the present invention. The embodiments of the invention disclosed herein are the best modes contemplated by the inventor for carrying out the invention in a commercial environment, although it should be understood that various modifications can be accomplished within the parameters of the present invention.

The uncooked ready to eat food bar of the present invention is formed to include a mixture of dry ingredients that are combined with a mixture of liquid ingredients so that the ratio, by weight, of dry ingredients to liquid ingredients is approximately 3:1. The dry ingredients include one or more ingredients containing dietary fiber and constituting in aggregate about 38% by weight of the dry ingredients. Each of the dietary fibers is selected from the group consisting of oatmeal, cornmeal, wheat germ, barley, rye, psyllium husk, apple pectin, spelt flour, kamut flour, and dried unsulfured date, fig, papaya, raisin, apricot, pineapple, banana, mulberry, cherry, prune, sultana, and apple. Additional dry ingredients include one or more ingredients containing non-animal protein and constituting in aggregate about 18% by weight of the dry ingredients and selected from the group consisting of soy, wheat germ, gelatin, yeast, almond, hulled sesame seed, sunflower seed, flax seed, oatmeal, and whey, and the product sold under the trademark FRUITEIN, (all natural blend of soy protein, vitamins, minerals, enzymes, herbs, and whole foods), sold by Nature's Plus. Other dry ingredients include one or more dry flavorings, with each dry flavoring selected from the group consisting of coriander seed, ground cardamom, and ground clove, and the product sold under the trademark Fruitein. Yet other dry ingredients include at least one dry ingredient containing simple carbohydrate, at least one dry ingredient containing sugar, and at least one dry ingredient containing complex carbohydrate, with each dry ingredient containing complex carbohydrate selected from the group consisting of flax seed, sunflower seed, hulled sesame seed, oatmeal, wheat germ, and yeast. The dry ingredients of the present invention further include at least one ingredient containing lecithin, which may be selected to be soy granule.

The essential fatty acids, superunsaturated alpha-linolenic acid and polyunsaturated linoleic acid, have been reported to be valuable in human nutrition as free radical formers, although the human body is incapable of their production. It has been reported that a ratio by weight of polyunsaturated linoleic acid to superunsaturated alpha-linolenic acid of approximately 3:1 is optimal for human nutrition. Further dry ingredients, constituting in aggregate about 19% by weight of the dry ingredients, include one or more oil seeds containing polyunsaturated linoleic acid selected from the group consisting of flax seed, sunflower seed, and hulled sesame seed, and one or more oil seeds containing superunsaturated alpha-linolenic acid, which may be selected to be flax seed. The oil seeds are selected so that when considered in aggregate with polyunsaturated linoleic acid and superunsaturated alpha-linolenic acid provided by the mixture of liquid ingredients as will be described, the ratio of polyunsaturated linoleic acid to superunsaturated alpha-linolenic acid in the food bar of the present invention is approximately 3:1 by weight.

The amino acids have been reported to have beneficial properties of decreasing some effects of oxidation processes in the body. A number of proteins lack the amino acids methionine and tryptophan, including the proteins of wheat germ and soy, thereby preventing complete utilization of the protein by the body. However, by combining an ingredient having methionine and tryptophan with protein sources lacking in methionine and tryptophan, such as wheat germ and soy, more complete metabolism of protein may be effectuated. One or more seeds containing amino acids are provided as other dry ingredients, with each seed selected from the group consisting of flax seed, sunflower seed, and hulled sesame seed.

Chlorophyll has been reported to indirectly stimulate the production of hemoglobin. The dry ingredients of the present invention further include at least one ingredient containing chlorophyll, which may be selected to be wheat grass.

Pyridoxine, also known as vitamin B₆ has been reported to be important in metabolizing amino acids and the body's use of potassium. Dry ingredients of the present invention further include at least one ingredient containing pyridoxine, which may be selected from the group consisting of brewers yeast, wheat germ, oats, hulled sesame seed, desiccated coconut, almond, hazel, macadamia, pine nut, walnut, kukui, and pistachio, and dried date, fig, papaya, raisin, apricot, pineapple, banana, mulberry, cherry, prune, sultana, and apple. It will be appreciated that each dried fruit ingredient of the present invention may be produced by a variety of techniques including vacuum drying, freeze drying, spray drying, sun drying, machine drying, and heat drying, and that dried fruits may be produced in chopped, granulated, or powdered forms. Magnesium has been reported to be important in the metabolism of amino acids, carbohydrates, vitamin C and vitamin E, and the B vitamins. The present invention also provides at least one ingredient containing magnesium, each selected from the group consisting of oats, seeds, nuts, dried fruit, wheat germ, and soy.

The liquid ingredients of the present invention include about 90% by weight of one or more naturally occurring syrup sweeteners containing sugar, simple carbohydrates, and complex carbohydrates, with each syrup sweetener selected from the group consisting of honey, sorghum syrup, brown rice syrup, maple syrup, barley malt syrup, and molasses. Further liquid ingredients include one or more vegetable oils containing polyunsaturated linoleic acid, each selected from the group consisting of canola oil, safflower oil, sesame oil, soy oil, sunflower oil, grape seed oil, flax oil, hemp oil, pumpkin oil, walnut oil, almond oil, olive oil, corn oil, wheat germ oil, rice bran oil, kukui oil, chia oil and peanut oil, and one or more vegetable oils containing superunsaturated alpha-linolenic acid, each selected from the group consisting of canola oil, soy oil, flax oil, hemp oil, pumpkin oil, walnut oil, wheat germ oil, rice bran oil, kukui oil, and chia oil. Other liquid ingredients include one or more liquid flavorings derived from the group consisting of fruit oil, fruit extract, herb oil, herb extract, spice oil, spice extract, and syrup sweetener, with each the group consisting of orange oil, lemon oil, sorghum syrup, honey, and brown rice syrup particularly advantageous. By selection of appropriate liquid flavoring and dry flavoring, the unpleasant taste of ingredients such as soy, yeast, lecithin and psyllium may be effectively masked.

One or more antioxidants may be provided and combined with the mixture of dry ingredients and the mixture of liquid ingredients, with each antioxidant selected from the group consisting of wheat grass, orange crystal, banana crystal, strawberry crystal, carrot juice powder, pineapple crystal, coriander seed, beet juice powder, flax seed, hulled sesame seed, sunflower seed, hemp seed, vitamin E oil, and sorghum syrup, and the product sold under the trademark Fruitein. Antioxidants are provided in the present invention as advantageous factors in human nutrition, and additionally, to act as preservatives of the ingredients the present invention, thereby prolonging shelf life. In this regard, it is believed that preservation of polyunsaturated linoleic acid and superunsaturated alpha-linolenic acid is furthered by the presence of sorghum syrup and vitamin E oil, as will be described.

Additionally, in unprocessed, unheated foods such as edible plants, the ratio of potassium to sodium is approximately 20:1 by weight, while many processed food products currently consumed have a significantly higher relative sodium content. Potassium has been reported to be associated with the production of insulin by the pancreas, and the metabolism of sucrose at cell membranes. Also, a number of studies have indicated that the ratio, by weight, of potassium to sodium in foods should be 3:1 or greater. The ingredients of the present invention are chosen so that potassium is present in a ratio of about 10:1 by weight to sodium.

A flavored coating may be applied to an exterior surface defined by the food bar, with coatings selected from the group consisting of sorghum syrup, honey, brown rice syrup, carob, white chocolate, caramel, peanut, fruit, and yogurt preferred.

The ingredients of the food bar of the present invention are selected so that the food bar contains about 35% by weight of complex carbohydrate and about 17% by weight of simple carbohydrate. Considering both the oil seeds of the mixture of dry ingredients and the vegetable oil of the mixture of liquid ingredients, polyunsaturated linoleic acid is present in the food bar in a ratio of about 3:1 by weight to superunsaturated alpha-linolenic acid. Preservation of polyunsaturated linoleic acid and superunsaturated alpha-linolenic acid, and thereby maintenance of the desired ratio of polyunsaturated linoleic acid to superunsaturated alpha-linolenic acid, is improved by presence of the antioxidants, with dimeric proanthocyaniden as provided by sorghum syrup, and vitamin E oil believed to be particularly important in such preservation. The food bar of the present invention may be formed of any convenient size and weight, with a weight of approximately 2.25 ounces (about 62 grams) particularly advantageous. The caloric content in a 2.25 ounce food bar is less than 250 calories, and the ingredients provide a food bar having no cholesterol and saturated fat of less than 1.2 grams. In addition, the food bar of the present invention provides about 7 grams of polyunsaturated linoleic acid and about 2 grams of superunsaturated alpha-linolenic acid, satisfying the recommended daily allowance, RDA, of polyunsaturated linoleic acid and of superunsaturated alpha-linolenic acid. Further, moisture content in the food bar of the present invention is maintained at about 10%, thereby providing a balance between dry, fibrous mouth feel associated with insufficient moisture and shortened shelf life associated with moisture content above 14%. The food bar of the present invention may be placed into any of a variety of opaque freshness preserving wrappings, including modified atmospheric packaging.

In an example of the food bar of the present invention, the mixture of dry ingredients includes, by weight, about 24% oatmeal, about 9% dried unsulfured date, about 8% the product sold under the trademark Fruitein, about 8% whey, about 7% hulled sesame seed, about 7% sunflower seed, about 6% wheat germ, about 5% flax seed, about 4% almond, about 4% desiccated coconut, about 3% coriander seed, about 3% soy, about 1% cornmeal, about 1% psyllium husk, about 1% spelt flour, about 1% kamut flour, about 1% gelatin, about 1% soy granule, about 1% orange crystal, about 1% pineapple crystal, about 1% banana crystal, about 1% brewers yeast, about 1% beet juice powder, about 0.4% carrot juice powder, about 0.4% strawberry crystals, about 0.4% wheat grass, about 0.4% apple pectin, and about 0.02% ground cardamon. In the example, a mixture of liquid ingredients includes, by weight about 30% raw unfiltered honey, about 30% sorghum syrup, about 29% brown rice syrup, about 9% hemp oil, about 1% orange oil, about 0.4% vitamin E oil, and about 0.4% lemon oil.

The example of the food bar of the present invention may be formed by mixing together all dry ingredients of the example other than date, and, after mixing, adding date. The mixture of liquid ingredients of the example may be formed by mixing raw unfiltered honey, sorghum syrup and brown rice syrup into hemp oil, and thereafter adding vitamin E oil, orange oil and lemon oil. After combining the mixture of dry ingredients into the mixture of liquid ingredients, the resultant material may be formed into a food bar. Subsequently, the coating may be applied to the exterior surface of the food bar, resulting in a ready to eat product.

A second preferred embodiment of the present invention is directed to consumption by individuals having allergies to food, whereby a number of ingredients commonly associated with food allergies present in the first embodiment of the present invention have been replaced appropriately. The dry ingredients include one or more ingredients containing dietary fiber constituting in aggregate about 33% by weight of the dry ingredients, with each of the dietary fibers selected from the group consisting of oatmeal, psyllium husk, rice bran, apple pectin, and dried unsulfured date, fig, papaya, raisin, apricot, pineapple, banana, mulberry, cherry, prune, sultana and apple. One or more ingredients containing non-animal protein and constituting in aggregate about 19% by weight of the dry ingredients are selected from the group consisting of barley flakes and oat bran. One or more dry flavorings are selected from the group consisting of coriander seed, ground cardamom, ground clove, and the product sold under the trademark Fruitein. At least one dry ingredient containing simple carbohydrate, at least one dry ingredient containing sugar, and at least one dry ingredient containing complex carbohydrate are provided, with each dry ingredient containing complex carbohydrate selected from the group consisting of flax seed, sunflower seed, hulled sesame seed, oatmeal, coriander seed, coconut, almond, rice bran, oat bran, and barley flakes. Further, at least one ingredient containing lecithin is provided, which may be selected to be soy granules. Other dry ingredients, constituting in aggregate about 19% by weight of the dry ingredients, are one or more oil seeds containing polyunsaturated linoleic acid selected from the group consisting of flax seed, sunflower seed, and hulled sesame seed, and one or more oil seeds containing superunsaturated alpha-linolenic acid, which may be selected to be flax seed. At least one ingredient containing chlorophyll, which may be selected to be barley green powder, is also provided, as is at least one ingredient containing pyridoxine selected from the group consisting of oats, hulled sesame seed, desiccated coconut, almond, hazel, macadamia, pine nut, walnut, kukui, and pistachio, and dried date, fig, papaya, raisin, apricot, pineapple, banana, mulberry, cherry, prune, sultana, and apple.

The liquid ingredients of the second preferred embodiment of the present invention include about 90% by weight of one or more naturally occurring syrup sweeteners containing sugar, simple carbohydrates, and complex carbohydrates, with each syrup sweetener selected from the group consisting of sorghum syrup and brown rice syrup. Further liquid ingredients include one or more vegetable oils containing polyunsaturated linoleic acid, each selected from the group consisting of canola oil, safflower oil, sesame oil, soy oil, sunflower oil, grape seed oil, flax oil, hemp oil, almond oil, pumpkin oil, walnut oil, olive oil, corn oil, wheat germ oil, rice bran oil, kukui oil, chia oil and peanut oil, and one or more vegetable oils containing superunsaturated alpha-linolenic acid, each selected form the group consisting of canola oil, soy oil, flax oil, hemp oil, pumpkin oil, walnut oil, wheat germ oil, rice bran oil, kukui oil, and chia oil. One or more liquid flavorings selected from the group consisting of orange oil, lemon oil, sorghum syrup, and brown rice syrup are also provided.

One or more antioxidants may be provided and combined with the mixture of dry ingredients and the mixture of liquid ingredients, with each antioxidant selected from the group consisting of orange crystal, carrot juice powder, pineapple crystal, coriander seed, beet juice powder, barley grass powder, flax seed, hulled sesame seed, sunflower seed, and the product sold under the trademark Fruitein, vitamin E oil, orange oil, lemon oil, and sorghum syrup. The ingredients of the second embodiment of the present invention are chosen so that potassium is present in a ratio of about 26:1 by weight to sodium.

In an example of the food bar of the second preferred embodiment of the present invention, the mixture of dry ingredients includes, by weight, about 15% oatmeal, about 10% barley flake, about 10% dried unsulfured fig, about 9% oat bran, about 7% hulled sesame seed, about 7% sunflower seed, about 7% dried unsulfured raisin, about 7% rice bran, about 6% raw desiccated coconut, about 5% flax seed, about 5% product sold under the trademark Fruitein, about 3% flaked coriander seed, about 3% almond, about 1% barley green powder, about 1% psyllium husk, about 1% soy granule, about 1% orange crystal, about 0.7% pineapple crystal, about 0.7% banana crystal, about 0.5% beet juice powder, about 0.4 carrot juice powder, about 0.3% strawberry crystal, about 0.3% apple pectin, about 0.1% ground cardamon, and about 0.004% vanilla planifolia. The mixture of liquid ingredients of the example of the food bar of the second preferred embodiment includes, by weight, about 64% brown rice syrup, about 26% sorghum, about 8% hemp oil, about 1% orange oil, about 0.7% lemon oil, and about 0.3% vitamin E oil. The example of the second preferred embodiment of the food bar of the present invention may be formed by mixing together all dry ingredients other than fig and raisin, and, after mixing, adding fig and raisin. The mixture of liquid ingredients of the example may be formed by mixing sorghum syrup and brown rice syrup into hemp oil, and thereafter adding orange oil, vitamin E oil, and lemon oil. After combining the mixture of dry ingredients into the mixture of liquid ingredients, the resultant material may be formed into a food bar as previously described.

A third preferred embodiment of the present invention is directed to consumption by individuals having who wish to reduce their total caloric intake, whereby a number of ingredients of relatively high calorie content present in the first embodiment of the present invention have been replaced. The dry ingredients include one or more ingredients containing dietary fiber constituting in aggregate about 44% by weight of the dry ingredients, with each of the dietary fibers selected from the group consisting of oatmeal, cornmeal, wheat germ, barley, rye, psyllium husk, apple pectin, spelt flour, kamut flour, and dried unsulfured date, fig, papaya, raisin, apricot, pineapple, banana, mulberry, cherry, prune, sultana, and apple. Additional dry ingredients include one or more ingredients containing non-animal protein and constituting in aggregate about 12% by weight of the dry ingredients and selected from the group consisting of soy, wheat germ, gelatin, yeast, almond, hulled sesame seed, sunflower seed, flax seed, oatmeal, whey, and the product sold under the trademark Fruitein. Other dry ingredients include one or more dry flavorings, with each dry flavoring selected from the group consisting of coriander seed, ground cardamom, ground clove, and the product sold under the trademark Fruitein. Yet other dry ingredients include at least one dry ingredient containing simple carbohydrate, at least one dry ingredient containing sugar, and at least one dry ingredient containing complex carbohydrate, with each dry ingredient containing complex carbohydrate selected from the group consisting of flax seed, sunflower seed, hulled sesame seed, oatmeal, wheat germ, and yeast. The dry ingredients of the present invention further include at least one ingredient containing lecithin, which may be selected to be soy granules. Further dry ingredients, constituting in aggregate about 20% by weight of the dry ingredients, are one or more oil seeds containing polyunsaturated linoleic acid selected from the group consisting of flax seed, sunflower seed, and hulled sesame seed, and one or more oil seeds containing superunsaturated alpha-linolenic acid, which may be selected to be flax seed. At least one ingredient containing chlorophyll, which may be selected to be wheat grass, is also provided, as is at least one ingredient containing pyridoxine selected from the group consisting of oats, hulled sesame seed, desiccated coconut, almond, hazel, macadamia, pine nut, walnut, kukui, and pistachio, and dried date, fig, papaya, raisin, apricot, pineapple, banana, mulberry, cherry, prune, sultana, and apple.

The liquid ingredients of the third preferred embodiment of the present invention include about 90% by weight of one or more naturally occurring syrup sweeteners containing sugar, simple carbohydrates, and complex carbohydrates, with each syrup sweetener selected from the group consisting of sorghum syrup and brown rice syrup. Further liquid ingredients include one or more vegetable oils containing polyunsaturated linoleic acid, each selected from the group consisting of canola oil, safflower oil, sesame oil, soy oil, sunflower oil, grape seed oil, flax oil, hemp oil, pumpkin oil, walnut oil, almond oil, olive oil, corn oil, wheat germ oil, rice bran oil, kukui oil, chia oil and peanut oil, and one or more vegetable oils containing superunsaturated alpha-linolenic acid, each selected from the group consisting of canola oil, soy oil, flax oil, hemp oil, pumpkin oil, walnut oil, wheat germ oil, rice bran oil, kukui oil, and chia oil. One or more liquid flavorings selected from the group consisting of orange oil, lemon oil, sorghum syrup, and brown rice syrup are also provided, as is at least one antioxidant, selected from the group consisting of orange crystal, carrot juice powder, pineapple crystal, coriander seed, beet juice powder, cherry crystal, flax seed, hulled sesame seed, sunflower seed, the product sold under the trademark Fruitein, vitamin E oil and sorghum syrup. The ingredients of the second embodiment of the present invention are chosen so that potassium is present in a ratio of about 7:1 by weight to sodium.

In an example of the food bar of the third preferred embodiment of the present invention, the mixture of dry ingredients includes, by weight, about 26% oatmeal, about 8% hulled sesame seed, about 8% dried unsulfured raisin, about 7% sunflower seed, about 7% wheat germ, about 5% the product sold under the trademark Fruitein, about 5% flax seed, about 5% soy, about 5% desiccated coconut, about 4% coriander seed, about 3–4% almond, about 4% dried unsulfured fig, about 3% dried unsulfured date, about 1% psyllium husk, about 1% spelt flour, about 1% kamut flour, about 1% soy granule, about 1% orange crystal, about 1% banana crystal, about 1% pineapple crystal, about 1% brewers yeast, about 0.4% carrot juice powder, about 0.4% strawberry crystal, about 0.4% wheat grass, about 0.4% apple pectin, about 0.1% beet juice powder, and about 0.1% ground cardamon. The mixture of liquid ingredients of the example of the food bar of the third preferred embodiment includes, by weight, about 50% brown rice syrup, about 26% sorghum syrup, about 13% raw unfiltered honey, about 9% hemp oil, about 1% orange oil, about 1% lemon oil, and about 0.3% vitamin E oil.

The food bar of the present invention is fabricated without the use of baking, cooking, toasting or frying and is easily prepared with standard mixing techniques and then formed into a final product. No initial or subsequent baking, toasting, frying or cooking of the formed product or ingredients is necessary. Although the present invention has been described as a food bar, it is within the scope of the present invention to encompass sheets, bars, cookie shapes and the like as alternative configurations. In addition, by varying the relative proportions dry and liquid mixtures of ingredients, a number of other food items may be produced, including a cereal product produced when the ratio by weight of dry mixture to liquid mixture is 2:1, and a syrup for ice cream when the ratio by weight of dry mixture to liquid mixture is 1:2.

The present invention having been described in its preferred embodiments, it is clear that the present invention is susceptible to numerous modifications and embodiments within the ability of those skilled in the art and without the exercise of the inventive faculty. Accordingly, the scope of the present invention is defined as set forth by the scope of the following claims.

What is claimed is:

1. An uncooked ready to eat food bar consisting essentially of a mixture of dry ingredients combined with a mixture of liquid ingredients in a ratio of about 3:1 by weight, wherein said mixture of dry ingredients includes about 38% by weight of at least one dry ingredient containing dietary fiber, about 18% by weight of at least one dry ingredient containing non-animal protein, at least one dry ingredient containing antioxidant, at least one dry ingredient containing simple carbohydrate, at least one dry ingredient containing complex carbohydrate, at least one dry ingredient containing sugar, at least one dry ingredient containing lecithin, at least one oil seed containing polyunsaturated linoleic acid, at least one oil seed containing superunsaturated alpha-linolenic acid, at least one seed containing amino acids, at least one dry ingredient containing chlorophyll, at least one dry ingredient containing pyridoxine, at least one dry ingredient containing magnesium, at least one dry ingredient containing sodium, at least one dry ingredient containing potassium, and at least one dry flavoring, and said mixture of liquid ingredients includes at least one naturally occurring syrup sweetener containing sugar, simple carbohydrate and complex carbohydrate, at least one vegetable oil containing polyunsaturated linoleic acid, at least one vegetable oil containing superunsaturated alpha-linolenic acid, wherein the polyunsaturated linoleic acid is present in a ratio of about 3:1 by weight to superunsaturated alpha-linolenic acid and at least one oil containing antioxidant, said mixture of liquid ingredients containing about 90% by weight of said syrup sweetener, whereby the food bar contains about 35% by weight of complex carbohydrate, about 17% by weight of simple carbohydrate, potassium is present in the food bar in a ratio of about 10:1 by weight to sodium, and water is present in a ratio of about 1:3 to sugar and is less than about 10% by weight of the food bar.

2. An uncooked ready to eat food bar as set forth in claim 1, further comprising a coating applied to an exterior surface defined by the food bar, wherein said coating is selected from the group consisting of sorghum syrup, honey, brown rice syrup, carob, white chocolate, caramel, peanut, fruit, and yogurt.

3. An uncooked ready to eat food bar as set forth in claim 1, further comprising a polyunsaturated linoleic acid and superunsaturated alpha-linolenic acid natural preserving agent selected from the group consisting of sorghum syrup, vitamin E oil, wheat grass, orange crystal, carrot juice powder, pineapple crystal, strawberry crystal, banana crystal, beet juice powder, flax seed, hulled sesame seed, sunflower seed, and an all natural blend of soy protein, vitamins, minerals, enzymes, herbs, and whole foods, orange oil and lemon oil, and wherein each said oil seed containing polyunsaturated linoleic acid and each said seed containing amino acids is selected from the group consisting of flax seed, sunflower seed, and hulled sesame seed, and each seed containing superunsaturated alpha-linolenic acid is flax seed.

4. An uncooked ready to eat food bar as set forth in claim 1, wherein:

at least one dry ingredient containing chlorophyll is wheat grass; and each said dry ingredient containing pyridoxine is selected from the group consisting of brewers yeast, wheat germ, oat, hulled sesame seed, desiccated coconut, and dried unsulfured date, fig, papaya, raisin, apricot, pineapple, banana, mulberry, cherry, prune, sultana, and apple.

5. An uncooked ready to eat food bar as set forth in claim 1, wherein:

each said dry ingredient containing dietary fiber is selected from the group consisting of oatmeal, cornmeal, wheat germ, barley, rye, psyllium husk, apple pectin, spelt flour, kamut flour, and dried unsulfured date, fig, papaya, raisin, apricot, pineapple, banana, mulberry, cherry, prune, sultana, and apple;

each said dry ingredient containing non-animal protein is selected from the group consisting of soy, wheat germ, gelatin, yeast, almond, hulled sesame seed, sunflower seed, flax seed, oatmeal, whey; and an all natural blend of soy protein, vitamins, minerals, enzymes, herbs, and whole foods;

each said dry ingredient containing complex carbohydrate is selected from the group consisting of flax seed, sunflower seed, hulled sesame seed, oatmeal, wheat germ, and yeast;

each said dry flavoring is selected from the group consisting of coriander seed, ground cardamom, ground clove; and an all natural blend of soy protein, vitamins, minerals, enzymes, herbs, and whole foods;

each said liquid flavoring is selected from the group consisting of orange oil, lemon oil, sorghum syrup, honey, and brown rice syrup;

at least one dry ingredient containing lecithin is soy granule;

each said dry ingredient containing antioxidant is selected from the group consisting of wheat grass, orange crystal, banana crystal, strawberry crystal, carrot juice powder, pineapple crystal, coriander seed, beet juice powder, flax seed, hulled sesame seed, sunflower seed, and the product sold under the trademark Fruitein; and each said oil containing antioxidant is selected from the group consisting of orange oil, vitamin E oil, and lemon oil.

6. An uncooked ready to eat food bar as set forth in claim 1, wherein:

each said syrup sweetener is selected from the group consisting of honey, sorghum syrup, brown rice syrup, maple syrup, barley malt syrup, and molasses; and each said vegetable oil containing polyunsaturated linoleic acid and each vegetable oil containing superunsaturated alpha-linolenic acid is hemp oil.

7. An uncooked ready to eat food bar as set forth in claim 1, further comprising a coating applied to an exterior surface defined by the food bar, said coating selected from the group consisting of sorghum syrup, honey, brown rice syrup, carob, chocolate, white chocolate, caramel, peanut, fruit, and yogurt, and wherein:

said mixture of dry ingredients includes, by weight, about 24% oatmeal, about 9% dried unsulfured date, about 8% of an all natural blend of soy protein, vitamins, minerals, enzymes, herbs, and whole foods, about 8% whey, about 7% hulled sesame seed, about 7% sunflower seed, about 6% wheat germ, about 5% flax seed, about 4% almond, about 4% desiccated coconut, about 3% coriander seed, about 3% soy, about 1% cornmeal, about 1% psyllium husk, about 1% spelt flour, about 1% kamut flour, about 1% gelatin, about 1% soy granule, about 1% orange crystal, about 1% pineapple crystal, about 1% banana crystal, about 1% brewers yeast, about 1% beet juice powder, about 0.4% carrot juice powder, about 0.4% strawberry crystals, about 0.4% wheat grass, about 0.4% apple pectin, and about 0.02% ground cardamon; and said mixture of liquid ingredients includes, by weight, about 30% raw unfiltered honey, about 30% sorghum syrup, about 29% brown rice syrup, about 9% hemp oil, about 1% orange oil, about 0.4% vitamin E oil, and about 0.4% lemon oil.

8. An uncooked ready to eat food bar consisting essentially of a mixture of dry ingredients combined with a mixture of liquid ingredients in a ratio of about 3:1 by weight, wherein said mixture of dry ingredients includes about 33% by weight of at least one dry ingredient containing dietary fiber, about 19% by weight of at least one dry ingredient containing non-animal protein, at least one dry ingredient containing antioxidant, at least one dry ingredient containing simple carbohydrate, at least one dry ingredient containing complex carbohydrate, at least one dry ingredient containing sugar, at least one dry ingredient containing lecithin, at least one oil seed containing polyunsaturated linoleic acid, at least one oil seed containing superunsaturated alpha-linolenic acid, at least one seed containing amino acids, at least one dry ingredient containing chlorophyll, at least one dry ingredient containing pyridoxine, at least one dry ingredient containing magnesium, at least one dry ingredient containing sodium, at least one dry ingredient containing potassium, and at least one dry flavoring, and said mixture of liquid ingredients includes at least one naturally occurring syrup sweetener containing sugar, simple carbohydrate and complex carbohydrate, at least one vegetable oil containing polyunsaturated linoleic acid, wherein the polyunsaturated linoleic acid is present in a ratio of about 3:1 by weight to superunsaturated alpha-linolenic acid, at least one vegetable oil containing superunsaturated alpha-linolenic acid, and at least one oil containing antioxidant, said mixture of liquid ingredients containing about 90% by weight of said syrup sweetener, whereby the food bar contains about 35% by weight of complex carbohydrate, about 17% by weight of simple carbohydrate, potassium is present in the food bar in a ratio of about 26:1 by weight to sodium, and water is present in a ratio of about 1:3 to sugar and is less than about 10% by weight of the food bar.

9. An uncooked ready to eat food bar as set forth in claim 8, further comprising a polyunsaturated linoleic acid and superunsaturated alpha-linolenic acid natural preserving agent selected from the group consisting of sorghum syrup, vitamin E oil, banana crystal, strawberry crystal, orange crystal, carrot juice powder, pineapple crystal, beet juice powder, flax seed, hulled sesame seed, sunflower seed, coriander seed, orange oil and lemon oil, wherein each said oil seed containing polyunsaturated linoleic acid and each said seed containing all amino acids is selected from the group consisting of flax seed, sunflower seed, and hulled sesame seed, and each seed containing superunsaturated alpha-linolenic acid is flax seed.

10. An uncooked ready to eat food bar as set forth in claim 8, wherein:

at least one dry ingredient containing chlorophyll is barley grass powder; and each said dry ingredient containing pyridoxine is selected from the group consisting of oat, hulled sesame seed, desiccated coconut, almond, hazel, macadamia, pine nut, walnut, kukui, and pistachio, and dried unsulfured date, fig, papaya, raisin, apricot, pineapple, banana, mulberry, cherry, prune, sultana, and apple.

11. An uncooked ready to eat food bar as set forth in claim 8, wherein:

each said dry ingredient containing dietary fiber is selected from the group consisting of oatmeal, psyllium husk, rice bran, apple pectin, dried unsulfured date, fig, papaya, raisin, apricot, pineapple, banana, mulberry, cherry, prune, sultana, and apple;

each said dry ingredient containing non-animal protein is selected from the group consisting of barley flakes and oat bran;

each said dry ingredient containing complex carbohydrate is selected from the group consisting of flax seed, sunflower seed, hulled sesame seed, oatmeal, coriander seed, coconut, almond, rice bran, oat bran, and barley flakes;

each said dry flavoring is selected from the group consisting of coriander seed, ground cardamom, ground cloves, and vanilla planifolia; and an all natural blend of soy protein, vitamins, minerals, enzymes, herbs, and whole foods;

each said liquid flavoring is selected from the group consisting of orange oil, lemon oil, sorghum syrup, and brown rice syrup;

at least one dry ingredient containing lecithin is hulled sesame seed;

each said dry ingredient containing antioxidant is selected from the group consisting of orange crystal, carrot juice powder, pineapple crystal, coriander seed, beet juice powder, flax seed, hulled sesame seed, sunflower seed, barley grass powder, and an all natural blend of soy protein, vitamins, minerals, enzymes, herbs, and whole foods; and each said oil containing antioxidant is selected from the group consisting of sorghum syrup, orange oil, vitamin E oil, and lemon oil.

12. An uncooked ready to eat food bar as set forth in claim 8, wherein:

each said syrup sweetener is selected from the group consisting of sorghum syrup and brown rice syrup; and each said vegetable oil containing polyunsaturated linoleic acid and each vegetable oil containing superunsaturated alpha-linolenic acid is hemp oil.

13. An uncooked ready to eat food bar as set forth in claim 8, further comprising a coating applied to an exterior surface defined by the food bar.

14. An uncooked ready to eat food bar as set forth in claim 8, wherein:

said mixture of dry ingredients includes, by weight, about 15% oatmeal, about 10% barley flake, about 10% dried unsulfured fig, about 9% oat bran, about 7% hulled sesame seed, about 7% sunflower seed, about 7% dried unsulfured raisin, about 7% rice bran, about 6% raw desiccated coconut, about 5% flax seed, about 5% of an all natural blend of soy protein, vitamins, minerals, enzymes, herbs, and whole foods, about 3% flaked coriander seed, about 3% almond, about 1% barley green powder, about 1% psyllium husk, about 1% orange crystal, about 0.7% pineapple crystal, about 0.7% banana crystal, about 0.5% beet juice powder, about 0.4% carrot juice powder, about 0.3% strawberry crystal, about 0.3% apple pectin, about 0.1% ground cardamon, and about 0.004% vanilla planifolia; and said mixture of liquid ingredients includes, by weight, about 64% brown rice syrup, about 26% sorghum, about 8% hemp oil, about 1% orange oil, about 0.7% lemon oil, and about 0.3% vitamin E oil.

15. An uncooked ready to eat food bar consisting essentially of a mixture of dry ingredients combined with a mixture of liquid ingredients in a ratio of about 3:1 by weight, wherein said mixture of dry ingredients includes about 44% by weight of at least one dry ingredient containing dietary fiber, about 12% by weight of at least one dry ingredient containing non-animal protein, at least one dry ingredient containing antioxidant, at least one dry ingredient containing simple carbohydrate, at least one dry ingredient containing complex carbohydrate, at least one dry ingredient containing sugar, at least one dry ingredient containing lecithin, at least one oil seed containing polyunsaturated linoleic acid, at least one oil seed containing superunsaturated alpha-linolenic acid, wherein the polyunsaturated linoleic acid is present in a ratio of about 3:1 by weight to superunsaturated alpha-linolenic acid at least one seed containing amino acids, at least one dry ingredient containing chlorophyll, at least one dry ingredient containing pyridoxine, at least one dry ingredient containing magnesium, at least one dry ingredient containing sodium, at least one dry ingredient containing potassium, and at least one dry flavoring, and said mixture of liquid ingredients includes at least one naturally occurring syrup sweetener containing sugar, simple carbohydrate and complex carbohydrate, at least one vegetable oil containing polyunsaturated linoleic acid, at least one vegetable oil containing superunsaturated alpha-linolenic acid, wherein the polyunsaturated linoleic acid is present in a ratio of about 3:1 by weight to superunsaturated alpha-linolenic acid, and at least one oil containing antioxidant, said mixture of liquid ingredients containing about 89% by weight of said syrup sweetener, whereby the food bar contains about 35% by weight of complex carbohydrate, about 17% by weight of simple carbohydrate, potassium is present in the food bar in a ratio of about 7:1 by weight to sodium, and water is present in a ratio of about 1:3 to sugar and is less than about 10% by weight of the food bar.

16. An uncooked ready to eat food bar as set forth in claim 15, further comprising a polyunsaturated linoleic acid and superunsaturated alpha-linolenic acid natural preserving agent selected from the group consisting of sorghum syrup, vitamin E oil, banana crystal, strawberry crystal, orange crystal, carrot juice powder, pineapple crystal, beet juice powder, flax seed, hulled sesame seed, sunflower seed, coriander seed, wheat grass, orange oil and lemon oil, wherein each said oil seed containing polyunsaturated linoleic acid and each said seed containing all amino acids is selected from the group consisting of flax seed, sunflower seed, and hulled sesame seed, and each seed containing superunsaturated alpha-linolenic acid is flax seed.

17. An uncooked ready to eat food bar as set forth in claim 15, wherein:

at least one dry ingredient containing chlorophyll is wheat grass; and each said dry ingredient containing pyridoxine is selected from the group consisting of brewers yeast, wheat germ, oats, hulled sesame seed, desiccated coconut, and dried unsulfured date.

18. An uncooked ready to eat food bar as set forth in claim 15, wherein:

each said dry ingredient containing dietary fiber is selected from the group consisting of oatmeal, cornmeal, psyllium husk, apple pectin, spelt flour, kamut flour, dried unsulfured fig, dried unsulfured raisin and dried unsulfured date;

each said dry ingredient containing non-animal protein is selected from the group consisting of soy, wheat germ, gelatin, yeast, almond, hulled sesame seed, sunflower seed, flax seed, oatmeal, whey, and the product sold under the trademark Fruitein;

each said dry ingredient containing complex carbohydrate is selected from the group consisting of flax seed, sunflower seed, hulled sesame seed, oatmeal, wheat germ, and yeast;

each said dry flavoring is selected from the group consisting of coriander seed, ground cardamom, ground cloves;

each said liquid flavoring is selected from the group consisting of orange oil, lemon oil, sorghum syrup, honey, and brown rice syrup;

at least one dry ingredient containing lecithin is soy granule;

each said dry ingredient containing antioxidant is selected from the group consisting of wheat grass, orange crystal, banana crystal, strawberry crystal, carrot juice powder, pineapple crystal, coriander seed, beet juice powder, flax seed, hulled sesame seed, sunflower seed; and each said oil containing antioxidant is selected from the group consisting of orange oil, vitamin E oil, and lemon oil.

19. An uncooked ready to eat food bar as set forth in claim 15, wherein:

each said syrup sweetener is selected from the group consisting of honey, sorghum syrup, and brown rice syrup; and each said vegetable oil containing polyunsaturated linoleic acid and each vegetable oil containing superunsaturated alpha-linolenic acid is hemp oil.

20. An uncooked ready to eat food bar as set forth in claim 15, further comprising a coating applied to an exterior surface defined by the food bar, said coating selected from the group consisting of sorghum syrup, honey, brown rice syrup, carob, chocolate, white chocolate, caramel, peanut, fruit, and yogurt, and wherein:

said mixture of dry ingredients includes, by weight, about 26% oatmeal, about 8% hulled sesame seed, about 8% dried unsulfured raisin, about 7% sunflower seed, about 7% wheat germ, about 5% of an all natural blend of soy protein, vitamins, minerals, enzymes, herbs, and whole foods, about 5% flax seed, about 5% soy, about 5% desiccated coconut, about 4% coriander seed, about 4% dried unsulfured fig, about 3% almond, about 3% dried unsulfured date, about 1% psyllium husk, about 1% spelt flour, about 1% kamut flour, about 1% soy granule, about 1% orange crystal, about 1% banana crystal, about 1% pineapple crystal, about 1% brewers yeast, about 0.4% carrot juice powder, about 0.4% strawberry crystal, about 0.4% wheat grass, about 0.4% apple pectin, about 0.1% beet juice powder, and about 0.1% ground cardamon; and said mixture of liquid ingredients includes, by weight, about 50% brown rice syrup, about 26% sorghum syrup, about 13% raw unfiltered honey, about 9% hemp oil, about 1% orange oil, about 1% lemon oil, and about 0.3% vitamin E oil.

21. An uncooked ready to eat cereal product consisting essentially of a mixture of dry ingredients combined with a mixture of liquid ingredients in a ratio of about 2:1 by weight, wherein said mixture of dry ingredients includes about 38% by weight of at least one dry ingredient containing dietary fiber, about 18% by weight of at least one dry ingredient containing non-animal protein, at least one dry ingredient containing antioxidant, at least one dry ingredient containing simple carbohydrate, at least one dry ingredient containing complex carbohydrate, at least one dry ingredient containing sugar, at least one dry ingredient containing lecithin, at least one oil seed containing polyunsaturated linoleic acid, at least one oil seed containing superunsaturated alpha-linolenic acid, at least one seed containing all amino acids, at least one dry ingredient containing chlorophyll, at least one dry ingredient containing pyridoxine, at least one dry ingredient containing magnesium, at least one dry ingredient containing sodium, at least one dry ingredient containing potassium, and at least one dry flavoring, and said mixture of liquid ingredients includes at least one naturally occurring syrup sweetener containing sugar, simple carbohydrate and complex carbohydrate, at least one vegetable oil containing polyunsaturated linoleic acid, at least one vegetable oil containing superunsaturated alpha-linolenic acid, wherein polyunsaturated linoleic acid is present in the food bar in a ratio of about 3:1 by weight to superunsaturated alpha-linolenic acid and at least one oil containing antioxidant, said mixture of liquid ingredients containing about 90% by weight of said syrup sweetener, whereby the food bar contains about 35% by weight of complex carbohydrate, about 17% by weight of simple carbohydrate, potassium is present in the food bar in a ratio of about 10:1 by weight to sodium, and water is present in a ratio of about 1:3 to sugar and is less than about 10% by weight of the food bar.

22. An uncooked ready to eat syrup product consisting essentially of a mixture of dry ingredients combined with a mixture of liquid ingredients in a ratio of about 1:2 by weight, wherein said mixture of dry ingredients includes about 38% by weight of at least one dry ingredient containing dietary fiber, about 18% by weight of at least one dry ingredient containing non-animal protein, at least one dry ingredient containing antioxidant, at least one dry ingredient containing simple carbohydrate, at least one dry ingredient containing complex carbohydrate, at least one dry ingredient containing sugar, at least one dry ingredient containing lecithin, at least one oil seed containing polyunsaturated linoleic acid, at least one oil seed containing superunsaturated alpha-linolenic acid, at least one seed containing all amino acids, at least one dry ingredient containing chlorophyll, at least one dry ingredient containing pyridoxine, at least one dry ingredient containing magnesium, at least one dry ingredient containing sodium, at least one dry ingredient containing potassium, and at least one dry flavoring, and said mixture of liquid ingredients includes at least one naturally occurring syrup sweetener containing sugar, single carbohydrate and complex carbohydrate, at least one vegetable oil containing polyunsaturated linoleic acid, at least one vegetable oil containing superunsaturated alpha-linolenic acid, wherein polyunsaturated linoleic acid is present in the food bar in a ratio of about 3:1 by weight to superunsaturated alpha-linolenic acid and at least one oil containing antioxidant, said mixture of liquid ingredients containing about 90% by weight of said syrup sweetener, whereby the food bar contains about 35% by weight of complex carbohydrate, about 17% by weight of simple carbohydrate, potassium is present in the food bar in a ratio of about 10:1 by weight to sodium, and water is present in a ratio of about 1:3 to sugar and is less than about 10% by weight of the food bar.

\* \* \* \* \*